United States Patent
Sheng et al.

(10) Patent No.: US 10,191,512 B2
(45) Date of Patent: Jan. 29, 2019

(54) ELECTRONIC DEVICE AND METHOD FOR DISPOSING OF WATER AND MOISTURE ACCUMULATED IN ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jia Sheng, Shenzhen (CN); Jian-Lin Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 405 days.

(21) Appl. No.: 15/183,771

(22) Filed: Jun. 15, 2016

(65) Prior Publication Data

US 2017/0299264 A1   Oct. 19, 2017

(30) Foreign Application Priority Data

Apr. 18, 2016   (CN) .......................... 2016 1 0238547

(51) Int. Cl.
*F26B 3/00*   (2006.01)
*G06F 1/16*   (2006.01)
*G06F 1/20*   (2006.01)

(52) U.S. Cl.
CPC .......... *G06F 1/1626* (2013.01); *G06F 1/1658* (2013.01); *G06F 1/203* (2013.01); *G06F 1/206* (2013.01)

(58) Field of Classification Search
USPC ..................................... 34/443, 467
See application file for complete search history.

(56) References Cited

U.S. PATENT DOCUMENTS

| | | | |
|---|---|---|---|
| 5,640,783 A * | 6/1997 | Schumaier ................ | A61L 2/07 34/219 |
| 2009/0145783 A1 * | 6/2009 | Forker ................ | B65D 81/266 206/204 |
| 2014/0259730 A1 * | 9/2014 | Zielinski .................. | F26B 9/06 34/403 |
| 2016/0223257 A1 * | 8/2016 | Romanek ................ | A23B 7/01 |

* cited by examiner

*Primary Examiner* — John McCormack
(74) *Attorney, Agent, or Firm* — ScienBiziP, P.C.

(57) ABSTRACT

A heating plate is included in an electronic device which also includes a processor, a detecting unit, and a battery. The detecting unit detects values of electrical current in certain parts of the electronic device. The processor determines whether any of the detected values falls within a predetermined range. If the detected value falls within a predetermined range, the processor enables a connection between the battery and the heating plate to cause the heating plate to micro-heat the electronic device to promote or accelerate the evaporation of water or moisture in the electronic device. A method for water and moisture disposal by internal heating is also provided.

13 Claims, 4 Drawing Sheets

ELECTRONIC DEVICE AND METHOD FOR DISPOSING OF WATER AND MOISTURE ACCUMULATED IN ELECTRONIC DEVICE

CROSS-REFERENCE TO RELATED APPLICATIONS

This application claims priority to Chinese Patent Application No. 201610238547.4 filed on Apr. 18, 2016.

FIELD

The subject matter herein generally relates to electronic devices and methods for disposing water and vapor in electronic devices.

BACKGROUND

Portable electronic devices, such as computers, cameras, and mobile phones, may suffer damage when exposed to water. Therefore, structures and method should be protected against the internal presence of water.

BRIEF DESCRIPTION OF THE DRAWINGS

Implementations of the present technology will now be described, by way of example only, with reference to the attached figures.

DETAILED DESCRIPTION

Figure 1:
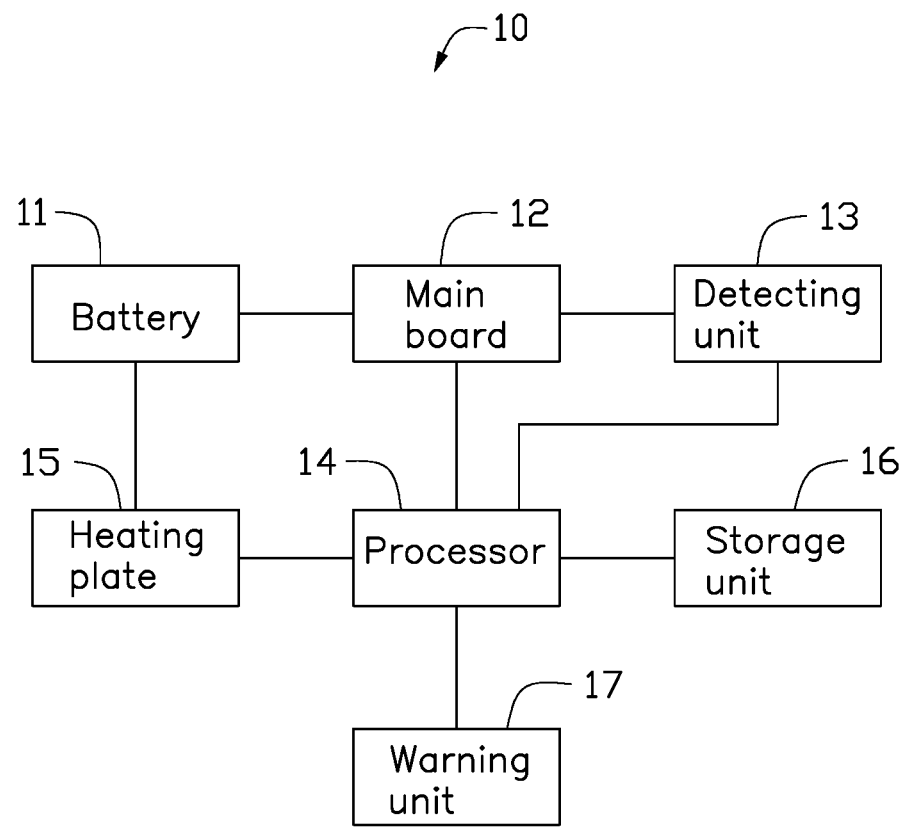
FIG. 1 is a block diagram illustrating an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series and the like.

FIG. 1 illustrates an exemplary embodiment of an electronic device 10. In the exemplary embodiment, the electronic device 10 at least includes a battery 11, a main board 12, a detecting unit 13, a processor 14, a heating plate 15, and a storage unit 16. The battery 11 is connected to the main board 12 to supply electric power for the main board 12. The heating plate 15 is coupled to the battery 11 and the processor 14. The detecting unit 13 is coupled to the processor 14 and is configured to detect a value of electrical current flowing in the electronic device 10 and transmit the detected value to the processor 14. The processor 14 acquires the detected value and determines whether the value falls within a predetermined range. When the processor 14 determines that the detected value falls within the predetermined value range, the processor 14 disconnects the connection between the battery 11 and the main board 12, and makes a connection between the battery 11 and the heating plate 15. Therefore, the heating plate 15 micro-heats the electronic device 10 to accelerate the evaporation of any water or moisture in the electronic device 10. In the exemplary embodiment, the degree of heating applied by the heating plate 15 is micro-heat, thus components in the electronic device 10 will not be damaged by the heat. In the exemplary embodiment, the electronic device 10 can be a mobile phone, a computer, a camera, or the like.

Figure 2:
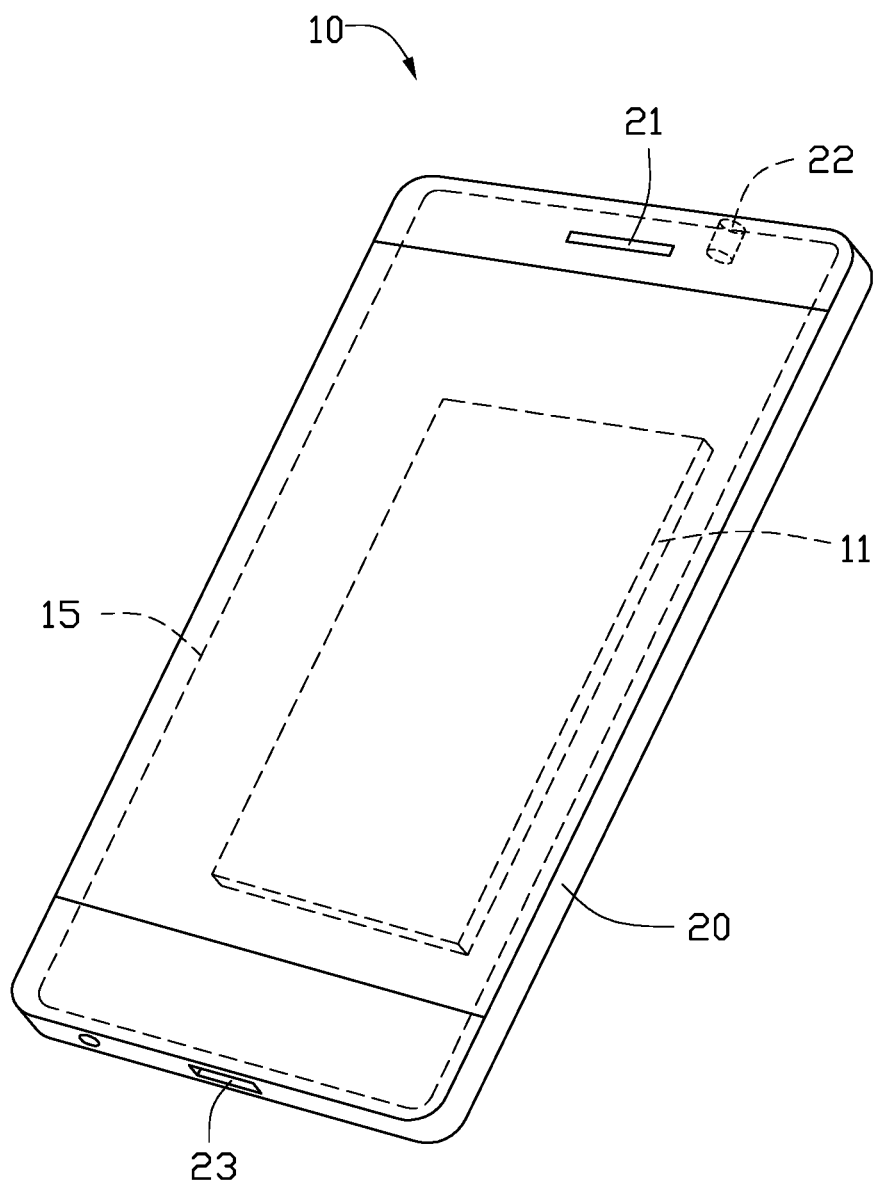
FIG. 2 is an isometric view illustrating an embodiment of an electronic device.

Referring to FIG. 2, in the exemplary embodiment, the electronic device 10 further includes a casing 20. The casing 20 defines a microphone hole 21, an earphone hole 22, and a charging hole 23. The battery 11, the main board 12, the detecting unit 13, the processor 14, and the heating plate 15 are all arranged in the casing 20. Water or moisture may enter into the electronic device 10 via the microphone hole 21, the earphone hole 22, and/or the charging hole 23. If water enters inside the electronic device 10, the electrical current in the microphone hole 21, the earphone hole 22, the charging hole 23 and/or in the main board 12 will be changed. The detecting unit 13 can detect the flow of electrical current in the microphone hole 21, the earphone hole 22, the charge hole 23, and in or on the main board 12 and can transmit the detected values to the processor 14. In the exemplary embodiment, the detecting unit 13 and the processor 14 are themselves waterproofed, thus water will not damage the detecting unit 13 or the processor 14. In the exemplary embodiment, the detecting unit 13 is an electric current detecting chip and the heating plate 15 is a thin metal sheet. In other embodiments, the detecting unit 13 can be a capacitor.

The heating plate 15 is arranged around the casing 20. In other embodiments, the heating plate 15 also can be arranged to face or be adjacent to specific or important components of the electronic device 10 to prevent water or moisture damage to delicate or vulnerable components.

Figure 3:
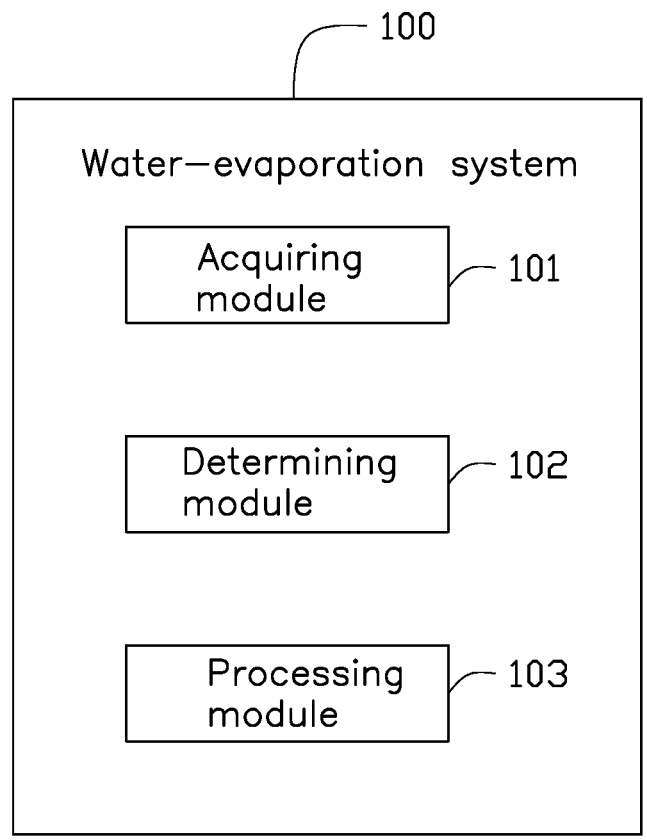
FIG. 3 is a block diagram illustrating an embodiment of a water-evaporation system running in an electronic device.

Referring to FIG. 3, a water-evaporation system 100 can run in the electronic device 10. In the embodiment, the water-evaporation system 100 includes a number of modules, which are collection of software instructions stored in the storage unit 16 and executed by the processor 14. In the embodiment, the modules include an acquiring module 101, a determining module 102, and a processing module 103. In the exemplary embodiment, the storage unit 16 can be a smart media card, a secure digital card, a hard disk, a flash memory, or a compact disk, for example. The processor 14 can be a Central Processing Unit, a micro processor, or other data processing chip.

The acquiring module 101 acquires the detected values of electrical current from the detecting unit 13.

The determining module 102 determines whether the detected value falls within the predetermined range. In this embodiment, the predetermined range is stored in the storage unit 16. In this embodiment, the predetermined range is between 0.5 milliamps (mA) and 3 mA, this range being established by experiments.

If the determining module 102 determines that the detected value falls within the predetermined range, the processing module 103 disconnects the connection between the battery 11 and the main board 12, and enables a connection between the battery 11 and the heating plate 15. The heating plate 15 can thus micro-heat the electronic device 10 to promote the evaporation of any water in the electronic device 10.

In the embodiment, the electronic device 10 further includes a warning unit 17 (see FIG. 1). If the determining module 102 determines that the detected values or any of them falls within the predetermined range, the processing module 103 further controls the warning unit 17 to output a warning to prompt users that water or moisture is present in the electronic device 10. In the embodiment, the warning unit 17 can be a loudspeaker or a flashing light, for example.

Figure 4:
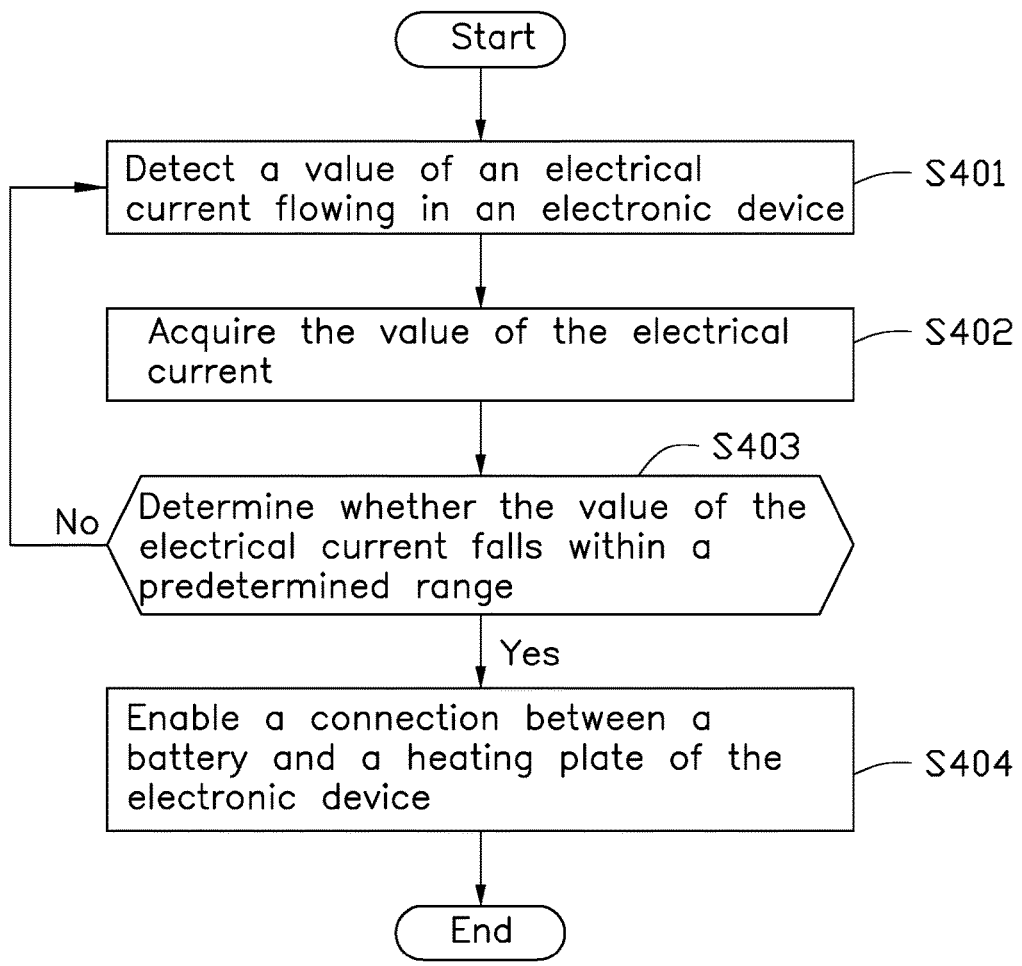
FIG. 4 is a flowchart illustrating a method for disposing of water and moisture applied in an electronic device.

FIG. 4 illustrates a method for disposing of water and moisture applied in an electronic device. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represents one or more processes, methods, or subroutines carried out in the example method. Additionally, the illustrated order of blocks is by example only and the order of the blocks can be changed. The example method can begin at block S401.

At block S401, a detecting unit detects a value of an electrical current flowing in the electronic device. In the exemplary embodiment, the detecting unit detects the value of the electrical current flowing in a microphone hole, an earphone hole, a charging hole defined in the electronic device. In other embodiments, the detecting unit detects the value of the electrical current in or on a main board of the electronic device.

At block S402, an acquiring module acquires the detected value of the electrical current from the detecting unit.

At block S403, a determining module determines whether the value of the electrical current falls within a predetermined range. If yes, the procedure goes to block 404; otherwise, the procedure goes back to block 401.

At block S404, a processing module enables a connection between a battery and a heating plate of the electronic device, thus the heating plate can micro-heat the electronic device to promote the evaporation of any water in the electronic device.

In the exemplary embodiment, at block 404, the processing module further disconnects a connection between the battery and a main board of the electronic device.

In the exemplary embodiment, block 404 further includes: the processing module controls a warning unit to output a warning to prompt users that water or moisture is presented in the electronic device.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A method for disposing of water and moisture applied in an electronic device, the electronic device comprising a processor, a battery, a heating plate, and at least one detector, the method comprising:
   detecting a value of electrical current flowing in the electronic device by the at least one detector;
   acquiring the value of the electrical current from the at least one detector by the processor;
   determining whether the value of the electrical current falls within a predetermined range; and
   enabling a connection between the heating plate and the battery to cause the heating plate to micro-heat the electronic device if determining that the value of the electrical current falls within the predetermined range.

2. The method for disposing of water and moisture according to claim 1, further comprising:
   disconnecting a connection between the battery and a main board of the electronic device by the processor, when determining that the value of the electrical current falls within the predetermined range.

3. The method for disposing of water and moisture according to claim 1, further comprising:
   controlling a warning unit of the electronic device, by the processor, to output a warning if determining that the value of the electrical current falls within the predetermined range.

4. The method for disposing of water and moisture according to claim 1, wherein the at least one detector detects the value of the electrical current of a microphone hole, an earphone hole, and a charging hole of the electronic device.

5. The method for disposing of water and moisture according to claim 1, wherein the predetermined range is between 0.5 milliamps and 3 milliamps.

6. An electronic device for disposing of water and moisture accumulated comprising:
   a heating plate configured to micro-heat the electronic device;
   a battery coupled to the heating plate and configured to supply electrical power for the heating plate;
   at least one detector to detect a value of electrical current flowing in the electronic device;
   a storage unit;
   a processor; and
   a plurality of modules which are collections of instructions stored in the storage unit and executed by the processor, the modules comprising:
   an acquiring module acquiring the value of the electrical current detected by the at least one detector;
   a determining module determining whether the value of the electrical current falls within a predetermined range; and
   a processing module enabling a connection between the battery and the heating plate to cause the heating plate to micro-heat the electronic device if the value of the electrical current falls within the predetermined range.

7. The electronic device according to claim 6, further comprising a main board coupled to the battery, wherein when the determining module determines that the value of electrical current falls within the predetermined range, the processing module disconnects a connection between the battery and the main board.

8. The electronic device according to claim 6, further comprising a warning unit, wherein when the determining module determines that the value of the electrical current falls within the predetermined range, the processing module controls the warning unit to output a warning.

9. The electronic device according to claim 6, further comprising a casing defining a microphone hole, an earphone hole, and a charging hole thereon, wherein the at least one detector detects the value of the electrical current flowing in the microphone hole, the earphone hole, and the charging hole.

10. The electronic device according to claim 6, wherein the predetermined range is between 0.5 milliamps and 3 milliamps.

11. The electronic device according to claim 6, wherein the at least one detector is an electric current detecting chip or a capacitor.

12. The electronic device according to claim 8, wherein the warning unit is a flashing light or a loudspeaker.

13. The electronic device according to claim 6, wherein the processor and the at least one detecting unit are themselves waterproofed.

\* \* \* \* \*